(12) United States Patent
Song et al.

(10) Patent No.: US 8,599,732 B2
(45) Date of Patent: Dec. 3, 2013

(54) METHOD FOR ENTERING AN IDLE MODE

(75) Inventors: Jianquan Song, Shenzhen (CN); Xin Liu, Shenzhen (CN); Li Chu, Shenzhen (CN); Hongyun Qu, Shenzhen (CN); Ling Xu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 208 days.

(21) Appl. No.: 13/054,897

(22) PCT Filed: Dec. 19, 2008

(86) PCT No.: PCT/CN2008/073614
§ 371 (c)(1),
(2), (4) Date: Apr. 13, 2011

(87) PCT Pub. No.: WO2010/009599
PCT Pub. Date: Jan. 28, 2010

(65) Prior Publication Data
US 2011/0188426 A1 Aug. 4, 2011

(30) Foreign Application Priority Data
Jul. 21, 2008 (CN) .......................... 2008 1 0134223

(51) Int. Cl.
*G08C 17/00* (2006.01)
(52) U.S. Cl.
USPC ........................................................ 370/311
(58) Field of Classification Search
None
See application file for complete search history.

(56) References Cited

U.S. PATENT DOCUMENTS

| | | | |
|---|---|---|---|
| 2008/0084842 A1* | 4/2008 | Xiang et al. | 370/329 |
| 2008/0259889 A1 | 10/2008 | Wu | |
| 2009/0055504 A1* | 2/2009 | Xie et al. | 709/207 |
| 2011/0149926 A1* | 6/2011 | Li et al. | 370/338 |

FOREIGN PATENT DOCUMENTS

| | | | |
|---|---|---|---|
| CN | 1852573 | A | 10/2006 |
| CN | 1960567 | A | 5/2007 |
| CN | 101137208 | A | 3/2008 |
| CN | 101147413 | A | 3/2008 |
| JP | 2005-522143 | A | 7/2005 |
| WO | 03085866 | A2 | 10/2003 |

OTHER PUBLICATIONS

WiMax Forum, "WiMax Forum Network Architecture (Stage 2: Architecture Tenets, Reference Model and Reference Points) [Part 2] Release 1.1.0", "Attachment 4-1-4: End-to-End Network Systems Architecture", Jul. 11, 2007, pp. 140-141.

* cited by examiner

*Primary Examiner* — Chirag Shah
*Assistant Examiner* — Rina Pancholi
(74) *Attorney, Agent, or Firm* — Hultquist, PLLC; Steven J. Hultquist; Mary B. Grant

(57) ABSTRACT

A method for entering an idle mode, which is used in a Worldwide Interoperability for Microwave Access system, comprising: during the procedure of a terminal enter to idle mode from active mode, an paging agent of the terminal sending mobility restriction parameters of the terminal to a mobility restriction parameter storage network element; the mobility restriction parameter storage network element saving the mobility restriction parameters; the mobility restriction parameter storage network element being an anchor paging controller, or an anchor authenticator, or a function entity including a function of the anchor paging controller and a function of the anchor authenticator. to save the mobility restriction parameters of a terminal when the terminal enters an idle mode may be achieved by using the method of the present invention, so that a mobility restriction judgment is performed to the terminal in the subsequent process procedure, and the problem of erroneously allowing the terminal to quit from the idle mode and enter an active mode or to update its location when the terminal is in the non-authorized regions can be avoided.

7 Claims, 3 Drawing Sheets

METHOD FOR ENTERING AN IDLE MODE

CROSS-REFERENCE TO RELATED APPLICATIONS

This application is a U.S. national phase application under the provisions of 35 U.S.C. §371 of International Patent Application No. PCT/CN08/73614 filed Dec. 19, 2008, which in turn claims priority of Chinese Patent Application No. 200810134223.1 filed Jul. 21, 2008. The disclosures of such international patent application and Chinese priority patent application are hereby incorporated by reference herein in their respective entireties, for all purposes.

FIELD OF THE INVENTION

The present invention relates to communication field, and in particular to a method for entering an idle mode in a Worldwide Interoperability for Microwave Access (WiMAX) system.

BACKGROUND OF THE INVENTION

At present an idle mode has been defined in WiMAX system. When a terminal enters the idle mode from an active mode, both the corresponding wireless connection thereof and the connection of an access network are released; meanwhile, the information of the terminal is saved in an anchor paging controller, thus the terminal occupies no wireless resource and the resource of the access network; the terminal which has entered into the idle mode receives downlink broadcast messages periodically, and does not need to register at a particular base station when traveling among a plurality of base stations, thus energy consumption can be saved.

No matter whether the procedure for entering the idle mode is initiated by the terminal or by the network, a paging agent will send terminal related information to the anchor paging controller of this terminal via an IM_Entry_State_Change_Request message which carries the information of this terminal required to be saved by the anchor paging controller (named as idle mode entering parameters hereinafter). The information comprises part or all of the following: an anchor paging controller identifier, an anchor authenticator identifier, an anchor gateway identifier, a current accessed base station identifier, a paging parameter, service flow information, an SBC (terminal basic capability) context, a REG (registration) context, a PKM (private key management) context, safety association description, and service flow information.

The anchor paging controller will also interact message(s) with the anchor authenticator of this terminal so as to make the anchor authenticator judge whether this terminal is allowed to enter the idle mode, upon receiving the IM_Entry_State_Change_Request message sent by the page proxy; the anchor authenticator will save the anchor paging controller identifier of this terminal only when it is determined that the terminal is allowed to enter the idle mode, further the anchor paging controller will save the above-mentioned idle mode entering parameters.

FIG. 1 is a schematic chart of the flow for a current WiMAX system terminal entering an idle mode, which comprises the following steps in particular:

101: the paging agent sends an IM_Entry_State_Change_Request message to the anchor paging controller (each anchor paging controller has one corresponding location register, and the location register records the information of the terminal in the idle mode); this message contains the parameters such as the current base station identifier, the paging parameters and idle mode reservation information; this message can arrive at the anchor paging controller via one or more relay paging controller.

102: the anchor paging controller sends the IM_Entry_State_Change_Request message to the anchor authenticator, and the anchor authenticator judges whether the terminal is allowed to enter the idle mode after receiving this message: if it is allowed, the anchor authenticator saves the anchor paging controller identifier.

103: the anchor authenticator sends an idle mode entering status change response message to the anchor paging controller; and this response message contains the judging result (result identifier) of the anchor authenticator; if the judging result indicates that the terminal is allowed to enter the idle mode, the anchor paging controller saves the above idle mode entering parameters of the terminal.

104: the anchor paging controller sends the idle mode entering status change response message to the paging agent; and this message may arrive at the anchor paging agent via one or more relay paging controllers.

In the above procedure for entering an idle mode in the current WiMAX system, no consideration is put to the mobility restriction characteristics of the terminal. The mobility restriction means that the user of a WiMAX system operator, without a mobility license, has to restrict its terminal in mobility; or that even the operator having a mobility license, the operator, in order to attract the low level users to use the WiMAX network, allows the low level users to use the WiMAX network with a low price by restricting the mobility of this type user terminal.

Therefore, by applying the current method for entering an idle mode, it is unable to judge the mobility restriction in the subsequent process procedures (for example, an idle mode exiting procedure, a location update procedure, and a procedure for re-distributing by the anchor paging controller or the anchor authenticator, etc.), which will result in the problems such as that the terminal will be erroneously allowed to exit an idle mode and enter an active mode or update its location in a non-authorized region.

SUMMARY OF THE INVENTION

The present invention aims to overcome the shortcomings in the prior art and to provide a method for entering an idle mode to perform a mobility restriction to a terminal.

The present invention provides a method for entering an idle mode in order to solve the above problem, which is used in a WiMAX system, and the method comprises:
  during the procedure of a terminal enter to idle mode from active mode, an paging agent of the terminal sending mobility restriction parameters of the terminal to a mobility restriction parameter storage network element;
  the mobility restriction parameter storage network element saving the mobility restriction parameters;
  the mobility restriction parameter storage network element being an anchor paging controller, or an anchor authenticator, or a function entity including a function of the anchor paging controller and a function of the anchor authenticator.

Moreover, the paging agent sends the mobility restriction parameters to the mobility restriction parameter storage network element by IM_Entry_State_Change_Request message containing the mobility restriction parameters.

In addition, if the mobility restriction parameter storage network element is the anchor paging controller, after receiving the IM_Entry_State_Change_Request message, the anchor paging controller sends the IM_Entry_State_Change_Request message to the anchor authenticator; and saves the mobility restriction parameters only when receiving a response message of the anchor authenticator allowing the terminal to enter the idle mode; and if the mobility restriction parameter storage network element is the anchor authenticator, or the function entity including the function of the anchor paging controller and the function of the anchor authenticator, the mobility restriction parameter storage network element judges whether the terminal is allowed to enter the idle mode after receiving the IM_Entry_State_Change_Request message, and saves the mobility restriction parameters only when it is determined that the terminal is allowed to enter the idle mode.

Moreover, the mobility restriction parameters comprise one or more of the following: an identifier list of base stations allowing or forbidding to be accessed, an identifier list of access service networks allowing or forbidding to be accessed, times of successive handover, an allowed minimum interval for the handover, an allowed or forbidden re-orientation region of a serving base station, and service continuity supporting identifier of the re-orientation region.

Further, the IM_Entry_State_Change_Request message comprises current location information of the terminal;

before the mobility restriction parameter storage network element saving the mobility restriction parameters, the mobility restriction parameter storage network element further performs a mobility restriction judgment to the terminal according to the location information and the mobility restriction parameters; if it is determined that the terminal does not satisfy a mobility restriction condition, then the following operations will be performed:

returning a failure response message of entering the idle mode to the paging agent; and/or triggering a network exit procedure of the terminal; and/or sending a notification message of beyond the mobility restriction region to the terminal.

Further, the location information comprises a base station identifier, and the mobility restriction parameters comprise: an identifier of the base station allowed to access or an identifier of the base station forbidden to access; and the terminal is determined to satisfy the mobility restriction condition only when the base station identifier belongs to the identifier of the base station allowed to access of the mobility restriction parameters or does not belong to the identifier of the base station forbidden to access of the mobility restriction parameters; or the location information comprises an identifier of an access serving network, and the mobility restriction parameters comprise: an identifier of the access serving network allowed to access or an identifier of the access serving network forbidden to access; and the terminal is determined to satisfy the mobility restriction condition only when the identifier of the access serving network belongs to the identifier of the access serving network allowed to access of the mobility restriction parameters or does not belong to the identifier of the access serving network forbidden to access of the mobility restriction parameters.

The present invention also provides a method for entering an idle mode, which is applied to a WiMAX system, and the method comprises:

during the procedure of a terminal entering an idle mode from an active mode, an anchor authenticator of the terminal sending mobility restriction parameters of the terminal to an anchor paging controller of the terminal by putting the mobility restriction parameters into an IM_Entry_State_Change_Response message;

the anchor paging controller saving the mobility restriction parameters after receiving the IM_Entry_State_Change_Response message.

Further, before sending the IM_Entry_State_Change_Response message, the anchor authenticator also judges whether the terminal is allowed to enter the idle mode; and the anchor authenticator sends the mobility restriction parameters to the anchor paging controller by putting the mobility restriction parameters into the IM_Entry_State_Change_Response message only when the terminal is allowed to enter the idle mode; the anchor paging controller saves the mobility restriction parameters of the terminal only when the IM_Entry_State_Change_Response message received contains information of the anchor authenticator allowing the terminal to enter the idle mode.

Moreover, during the procedure of the terminal entering the idle mode from the active mode and before the anchor authenticator sending the IM_Entry_State_Change_Response message, the method further comprises: a paging agent of the terminal sending the IM_Entry_State_Change_Response message containing current location information of the terminal to the anchor paging controller; before anchor paging controller saving the mobility restriction parameters, the anchor paging controller performs a mobility restriction judgment to the terminal according to the location information and the mobility restriction parameters; if it is determined that the terminal can not satisfy a mobility restriction condition, the following operations will be executed:

returning a failure response message of entering the idle mode to the paging agent; and/or triggering a network exit procedure of the terminal; and/or sending a notification message of beyond the mobility restriction region to the terminal.

Further, the location information comprises a base station identifier, and the mobility restriction parameters comprise: an identifier of the base station allowed to access or an identifier of the base station forbidden to access; and the terminal is determined to satisfy the mobility restriction condition only when the base station identifier belongs to the identifier of the base station allowed to access of the mobility restriction parameters or does not belong to the identifier of the base station forbidden to access of the mobility restriction parameters; or the location information comprises an identifier of an access serving network, and the mobility restriction parameters comprise: an identifier of the access serving network allowed to be accessed or the identifier of the access serving network forbidden to be accessed; the terminal is determined to satisfy the mobility restriction condition only when the identifier of the access serving network belongs to the identifier of the access serving network allowed to be accessed of the mobility restriction parameters or does not belong to the identifier of the access serving network forbidden to be accessed of the mobility restriction parameters.

In conclusion, it can be achieved to save the mobility restriction parameters of a terminal when the terminal enters an idle mode via the method of the present invention, so that a mobility restriction judgment is performed to the terminal in the subsequent process procedures, and thereby the problem of erroneously allowing the terminal to quit from the idle mode and enter an active mode or to update its location when the terminal is in the non-authorized regions can be avoided.

DETAILED DESCRIPTION OF EMBODIMENTS

WiMAX system may restrict the mobility of the terminal by employing the mobility restriction parameters; and the mobility restriction parameters, which may be determined according to the particular requirements of the operator, comprise but not limit to part or all of the following parameters: a region allowing to be accessed (or a region forbidding to be accessed), times of successive switch, an allowed minimum interval for the switch, an allowed or forbidden re-orientation region of serving base stations, and a service continuity supporting identifier of the re-orientation region.

The region allowing/forbidding to be accessed may be an identifier list of base stations allowing/forbidding to be accessed or an identifier list of access serving networks allowing/forbidding to be accessed.

Wherein the serving base station re-orientation refers to that a terminal will be re-oriented to another base station for being served when one of the base stations is overloaded; and the service continuity supporting identifier of the re-orientation region is used to indicate whether the service continuity is supported when a terminal is re-oriented to another base station (i.e., the current service of the terminal is kept uninterrupted).

The present invention will be described in detail in conjunction with the drawings and the embodiments hereinafter.

The First Embodiment

Figure 1:
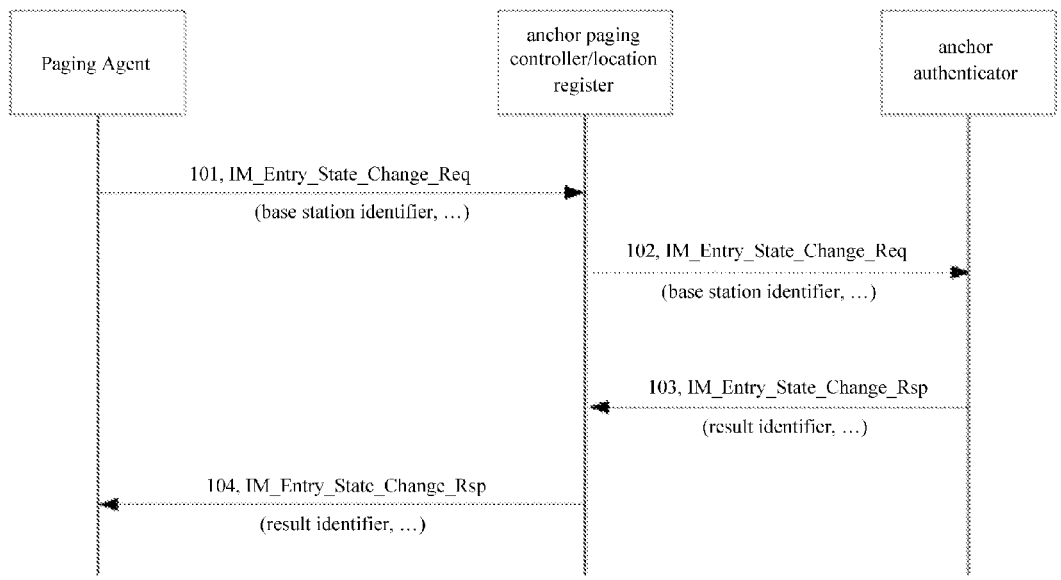
FIG. 1 is a schematic chart of the flow for a current WiMAX system terminal entering an idle mode.
Figure 2:
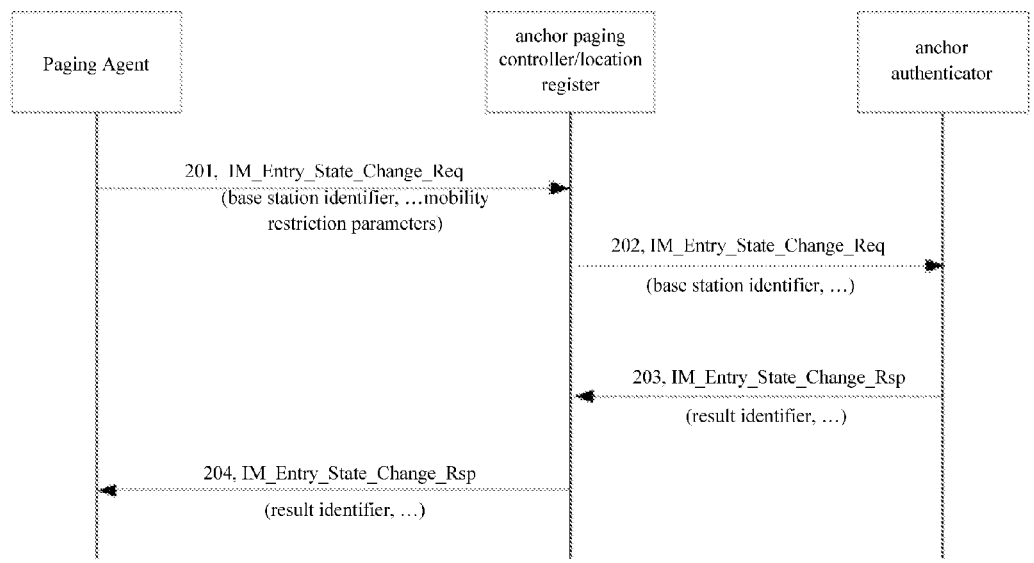
FIG. 2 is the flow chart of a method for entering an idle mode according to the first embodiment of the present invention.

FIG. 2 is the flow chart of a method for entering an idle mode according to the first embodiment of the present invention; wherein an anchor paging controller is selected to save the mobility restriction parameters of a terminal after the terminal enters the idle mode, and a paging agent sends the mobility restriction parameters of the terminal to the anchor paging controller via an IM_Entry_State_Change_Request message, the method comprises the following steps:

201: the paging agent sends the IM_Entry_State_Change_Request message to the anchor paging controller (each anchor paging controller has a corresponding location register which records the information of the terminal in the idle mode); the message carries a current base station identifier, paging parameters, idle mode reservation information, mobility restriction parameters of the terminal, etc.; and may arrive at the anchor paging controller via one or more relay paging controllers.

202: the anchor paging controller sends the IM_Entry_State_Change_Request message to the anchor authenticator, and the anchor authenticator judges whether the terminal is allowed to enter an idle mode after receiving the message, and if it is allowed, the anchor authenticator saves the identifier of the anchor paging controller.

203: the anchor authenticator sends an IM_Entry_State_Change_Response message to the anchor paging controller; and the response message carries the judging result of the anchor authenticator (result identifier); if the judging result indicates that the terminal is allowed to enter the idle mode, the anchor paging controller saves the mobility restriction parameters of the terminal and other information to be saved in the idle mode of the terminal.

If the terminal is not allowed to enter an idle mode, the terminal will be kept in an active status, and the anchor paging controller may not save the mobility restriction parameters of the terminal to save storage resource in this situation.

204: the anchor paging controller sends the IM_Entry_State_Change_Response message to the paging agent; and the message may be sent to the paging agent via one or more relay paging controllers.

Figure 3:
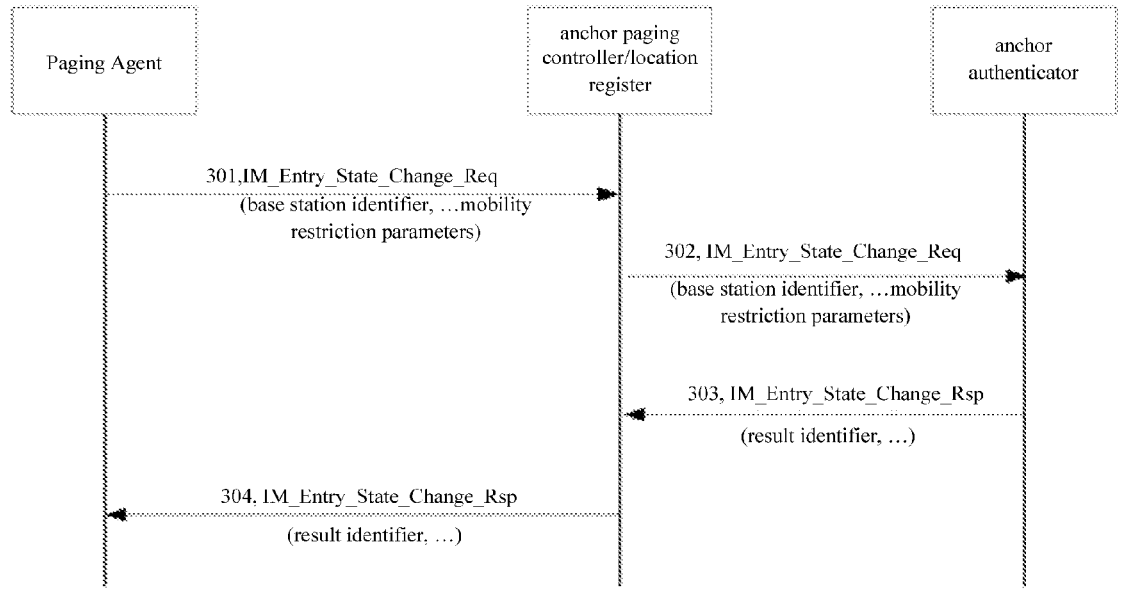
FIG. 3 is the flow chart of a method for entering an idle mode according to the second embodiment of the present invention.

FIG. 3 is the flow chart of a method for entering an idle mode according to the second embodiment of the present invention; in this embodiment, an anchor authenticator is selected to save mobility restriction parameters of a terminal after the terminal enters an idle mode, a paging agent sends the mobility restriction parameters of the terminal to the anchor authenticator via an IM_Entry_State_Change_Request message, and the method comprises the following steps:

301: the paging agent sending the IM_Entry_State_Change_Request message to an anchor paging controller (each anchor paging controller has a corresponding location register which is used to record the information of the terminal in the idle mode); the message contains a current base station identifier, paging parameters, idle mode reservation information, the mobility restriction parameters of the terminal, etc.; and may arrive at the anchor paging controller via one or more relay paging controllers.

302: the anchor paging controller sending the IM_Entry_State_Change_Request message to the anchor authenticator, which judges whether the terminal is allowed to enter the idle mode after receiving the message, and if it is allowed, the anchor authenticator saves the identifier of the anchor paging controller and the mobility restriction parameters of the terminal.

303: the anchor authenticator sends an IM_Entry_State_Change_Response message to the anchor paging controller; and the response message carries the judging result of the anchor authenticator (result identifier); if the judging result indicates that the terminal is allowed to enter the idle mode, the anchor paging controller saves the information to be saved in the idle mode of the terminal other than the mobility restriction parameters of the terminal.

304: the anchor paging controller sends the IM_Entry_State_Change_Response message to the paging agent; and the message may arrived at the paging agent via one or more relay paging controllers.

The Third Embodiment

Figure 4:
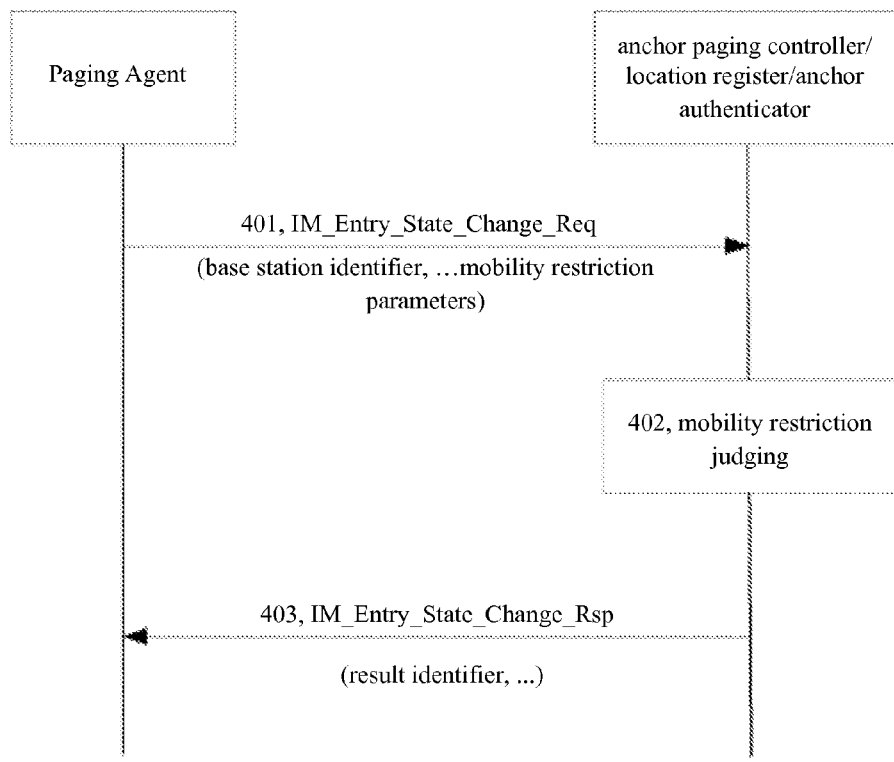
FIG. 4 is the flow chart of a method for entering an idle mode according to the third embodiment of the present invention.

FIG. 4 is the flow chart of a method for entering an idle mode according to the third embodiment of the present invention; wherein an anchor paging controller and an anchor authenticator are arranged in a same function entity (named as an anchor paging controller/anchor authenticator), the function entity is selected to save mobility restriction parameters of a terminal after the terminal enters an idle mode, a paging agent sends the mobility restriction parameters of the terminal to the function entity via an IM_Entry_State_Change_Request message, and the method comprises the following steps:

401: the paging agent sends the IM_Entry_State_Change_Request message to the anchor paging controller (each anchor paging controller has a corresponding location register, and the location register records the information of the terminal in the idle mode)/anchor authenticator; the message contains a current base station identifier, paging parameters, idle mode reservation information, the mobility restriction parameters of the terminal, etc.; and may be sent to the anchor paging controller/anchor authenticator via one or more relay paging controllers.

402: the anchor paging controller/anchor authenticator judges whether the terminal is allowed to enter the idle mode after receiving the IM_Entry_State_Change_Request message, and if it is allowed, the anchor paging controller/anchor authenticator saves the mobility restriction parameters of the terminal and other parameters.

The Fourth Embodiment

Figure 5:
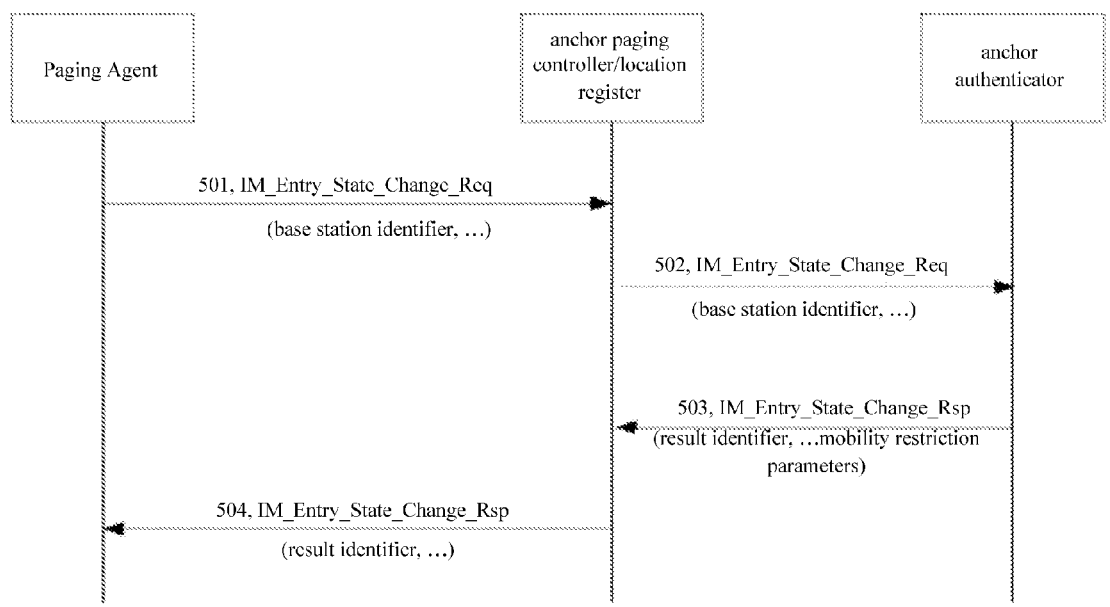
FIG. 5 is the flow chart of a method for entering an idle mode according to the fourth embodiment of the present invention.

FIG. 5 is the flow chart of a method for entering an idle mode according to the fourth embodiment of the present invention, in the embodiment, an anchor paging controller is selected to save mobility restriction parameters of a terminal after the terminal enters an idle mode, an anchor authenticator sends the mobility restriction parameters of the terminal to the anchor paging controller by an IM_Entry_State_Change_Response message, and the method comprises the following steps:

501: a paging agent sends an IM_Entry_State_Change_Request message to the anchor paging controller (each anchor paging controller has a corresponding location register which records the information of the terminal in the idle mode); and the message carries a current base station identifier, paging parameters, idle mode reservation information, etc.; and may arrive at the anchor paging controller via one or more relay paging controllers.

502: the anchor paging controller sends the IM_Entry_State_Change_Request message to the anchor authenticator, which judges whether the terminal is allowed to enter the idle mode after receiving the message, and if it is allowed, the anchor authenticator saves the identifier of the anchor paging controller.

503: the anchor authenticator sends an IM_Entry_State_Change_Response message to the anchor paging controller; and the response message contains the judging result of the anchor authenticator (result identifier) and the mobility restriction parameters of the terminal saved in the anchor authenticator; if the judging result indicates that the terminal is allowed to enter the idle mode, the anchor paging controller saves the mobility restriction parameters of the terminal and other information to be saved in the idle mode of the terminal.

If the terminal is not allowed to enter the idle mode, the terminal will be kept in an active state, and the anchor paging controller may not save the mobility restriction parameters of the terminal to save storage resource in this case.

504: the anchor paging controller sends the IM_Entry_State_Change_Response message to the paging agent; and the message may arrive at the paging agent via one or more relay paging controllers.

According to the basic principle of the present invention, above embodiments may have a plurality of variations, for example:

(1) the IM_Entry_State_Change_Request message sent by the paging agent may also carry the location information other than the current base station identifier, for example, an identifier of an access serving network.

(2) the anchor paging controller or the anchor authenticator, before saving the mobility restriction parameters of the terminal, may also perform mobility restriction judgment to judge whether the current location information of the terminal satisfies the mobility restriction condition (i.e., judging whether the location information belongs to the identifier of the base station allowing to be accessed or the identifier of the serving network allowing to be accessed, or the identifier of the base station forbidding to be accessed or the identifier of the serving network forbidding to be accessed) according to the current location information and the mobility restriction parameters of the terminal; if it satisfies the mobility restriction condition, the mobility restriction parameters of the terminal will be saved; otherwise, the following processing will be performed which does not satisfy the mobility restriction condition:

A) processing according to a method for failure to enter the idle mode in current WiMAX system, i.e., returning a response message for the terminal being not allowed to enter the idle mode, wherein, a value indicating the reason that the mobility restriction results in failure to enter the idle mode may be added into the response message, in order that the terminal performs corresponding error processing; and/or B) triggering the network exit procedure of the current terminal; and/or C) sending a notification message of beyond the mobility restriction region to the terminal.

In addition, if the anchor paging controller is selected to save the mobility restriction parameters of the terminal, the above mobility restriction judging operation may be executed when the anchor paging controller receives the IM_Entry_State_Change_Request message sent by the paging agent, when it is determined that the current location information of the terminal does not satisfy the mobility restriction condition, the processing for not satisfying the mobility restriction condition may be directly performed without the subsequent Steps 203 and 204, so as to save unnecessary processing. Certainly, above mobility restriction determination operation may also be executed when the IM_Entry_State_Change_Response message sent by the anchor authenticator is received, in this case, if it is determined that the current location information of the terminal does not satisfy the mobility restriction condition, the processing for not satisfying the mobility restriction condition will be performed.

In addition, if the anchor authenticator is selected to save the mobility restriction parameters of the terminal, the above result of the mobility restriction judging may be sent to the anchor paging controller by incorporating the result into the IM_Entry_State_Change_Response message, and the anchor paging controller determines to perform the processing for not satisfying mobility restriction condition.

(3) for the fourth embodiment, if the anchor authenticator does not allow the terminal to enter the idle mode, the mobility restriction parameters of the terminal may not be contained in the IM_Entry_State_Change_Response message which is sent to the anchor paging controller by anchor authenticator.

INDUSTRY APPLICABILITY

Based on above description, it can be achieved, via the method of the present invention, to save the mobility restriction parameters of a terminal when the terminal enters an idle mode, so that a mobility restriction judgment is performed to the terminal in the subsequent process procedures, and thereby the problem of erroneously allowing the terminal to quit from the idle mode and enter an active mode or to update its location when the terminal is in the non-authorized regions can be avoided.

What is claimed is:

1. A method for entering an idle mode, which is used in a Worldwide Interoperability for Microwave Access (WiMax) system, wherein the method comprises:

during the procedure of a terminal enter to idle mode from active mode, a paging agent of the terminal sending current location information of the terminal and mobility restriction parameters of the terminal to a mobility restriction parameter storage network element;

performing a mobility restriction judgment to the terminal according to the current location information and the mobility restriction parameters; and determining if the current location information satisfies a mobility restriction condition set by the mobility restriction parameters; and the mobility restriction parameter storage network element saving the mobility restriction parameters if the mobility restriction condition is satisfied;

wherein the mobility restriction parameter storage network element is an anchor paging controller, an anchor authenticator, or a function entity including a function of the anchor paging controller and a function of the anchor authenticator;

wherein the mobility restriction parameters comprise one or more of the following: an identifier list of base stations allowed or forbidden to be accessed, an identifier list of access service networks allowed or forbidden to be accessed, times of successive handover, an allowed minimum interval for the handover, an allowed or forbidden re-orientation region of a serving base station, and a service continuity supporting identifier of the re-orientation region;

wherein the location information comprises a base station identifier; the mobility restriction parameters comprise: an identifier of the base station allowed to access or an identifier of the base station forbidden to access; and the terminal is determined to satisfy the mobility restriction condition only when the base station identifier belongs to the identifier of the base station allowed to access of the mobility restriction parameters or does not belong to the identifier of the base station forbidden to access of the mobility restriction parameters; or the location information comprises an identifier of an access serving network; the mobility restriction parameters comprise: an identifier of the access serving network allowed to access or an identifier of the access serving network forbidden to access; and the terminal is determined to satisfy the mobility restriction condition only when the identifier of the access serving network belongs to the identifier of the access serving network allowed to access of the mobility restriction parameters or does not belong to the identifier of the access serving network forbidden to access of the mobility restriction parameters.

2. The method according to claim 1, wherein
the paging agent sends the mobility restriction parameters to the mobility restriction parameter storage network element by an IM_Entry_State_Change_Request message containing the current location information and the mobility restriction parameters.

3. The method according to claim 2, wherein
if the mobility restriction parameter storage network element is the anchor paging controller, after receiving the IM_Entry_State_Change_Request message, the anchor paging controller sends the IM_Entry_State_Change_Request message to the anchor authenticator; and the mobility restriction parameters are saved only when a response message of the anchor authenticator allowing the terminal to enter the idle mode is received; and/or if the mobility restriction parameter storage network element is the anchor authenticator, or the function entity including the function of the anchor paging controller and the function of the anchor authenticator, after the mobility restriction parameter storage network element receiving the IM_Entry_State_Change_Request message, the mobility restriction parameter storage network element judges whether the terminal is allowed to enter the idle mode; and the mobility restriction parameters are saved only when it is determined that the terminal is allowed to enter the idle mode.

4. The method according to claim 2, wherein
before the mobility restriction parameter storage network element saving the mobility restriction parameters, the mobility restriction parameter storage network element performs a mobility restriction judgment to the terminal according to the location information and the mobility restriction parameters; if it is determined that the terminal does not satisfy the mobility restriction condition, then one or more of the following operations will be performed:

returning a failure response message of entering the idle mode to the paging agent; triggering a network exit procedure of the terminal; and sending a notification message of beyond a mobility restriction region to the terminal.

5. A method for entering an idle mode, which is used in a Worldwide Interoperability for Microwave Access (WiMax) system, wherein the method comprises:

during the procedure of a terminal entering an idle mode from an active mode, an anchor authenticator of the terminal sending current location information of the terminal and mobility restriction parameters of the terminal to an anchor paging controller of the terminal by putting the mobility restriction parameters into an IM_Entry_State_Change_Response message;

performing a mobility restriction judgment to the terminal according to the current location information and the mobility restriction parameters; and determining if the current location information satisfies a mobility restriction condition set by the mobility restriction parameters; and the anchor paging controller saving the mobility restriction parameters after receiving the IM_Entry_State_Change_Response message;

wherein the mobility restriction parameters comprise one or more of the following: an identifier list of base stations allowed or forbidden to be accessed, an identifier list of access service networks allowed or forbidden to be accessed, times of successive handover, an allowed minimum interval for the handover, an allowed or forbidden re-orientation region of a serving base station, and a service continuity supporting identifier of the re-orientation region;

wherein the location information comprises a base station identifier; the mobility restriction parameters comprise: an identifier of the base station allowed to access or an identifier of the base station forbidden to access; and the terminal is determined to satisfy the mobility restriction condition only when the base station identifier belongs to the identifier of the base station allowed to access of the mobility restriction parameters or does not belong to the identifier of the base station forbidden to access of the mobility restriction parameters; or the location information comprises an identifier of an access serving network; the mobility restriction parameters comprise: an identifier of the access serving network allowed to access or an identifier of the access serving network forbidden to access; and the terminal is determined to satisfy the mobility restriction condition only when the identifier of the access serving network belongs to the identifier of the access serving network allowed to access of the mobility restriction parameters or does not belong to the identifier of the access serving network forbidden to access of the mobility restriction parameters.

6. The method according to claim 5, wherein before sending the IM_Entry_State_Change_Response message, the anchor authenticator also judges whether the terminal is allowed to enter the idle mode; and the anchor authenticator sends the current location information and the mobility restriction parameters to the anchor paging controller by putting the mobility restriction parameters into the IM_Entry_State_Change_Response message only when the terminal is allowed to enter the idle mode; and only when the IM_Entry_State_Change_Response message received contains information of the anchor authenticator allowing the terminal to enter the idle mode, the anchor paging controller saves the mobility restriction parameters of the terminal.

7. The method according to claim 5, wherein during the procedure of the terminal entering the idle mode from the active mode and before the anchor authenticator sending the IM_Entry_State_Change_Response message, a paging agent of the terminal sending an IM_Entry_State_Change_Request message containing the current location information of the terminal to the anchor paging controller; and before the anchor paging controller saving the mobility restriction parameters, the anchor paging controller performs a mobility restriction judgment to the terminal according to the location information and the mobility restriction parameters; if it is determined that the terminal can not satisfy the mobility restriction condition, then one or more of the following operations will be performed:

returning a failure response message of entering the idle mode to the paging agent;

triggering a network exit procedure of the terminal; and sending a notification message of beyond a mobility restriction region to the terminal.

\* \* \* \* \*